July 21, 1964  A. R. HUTCHINSON  3,141,341
CULTIVATOR DRIVE ASSEMBLY
Filed Nov. 16, 1961
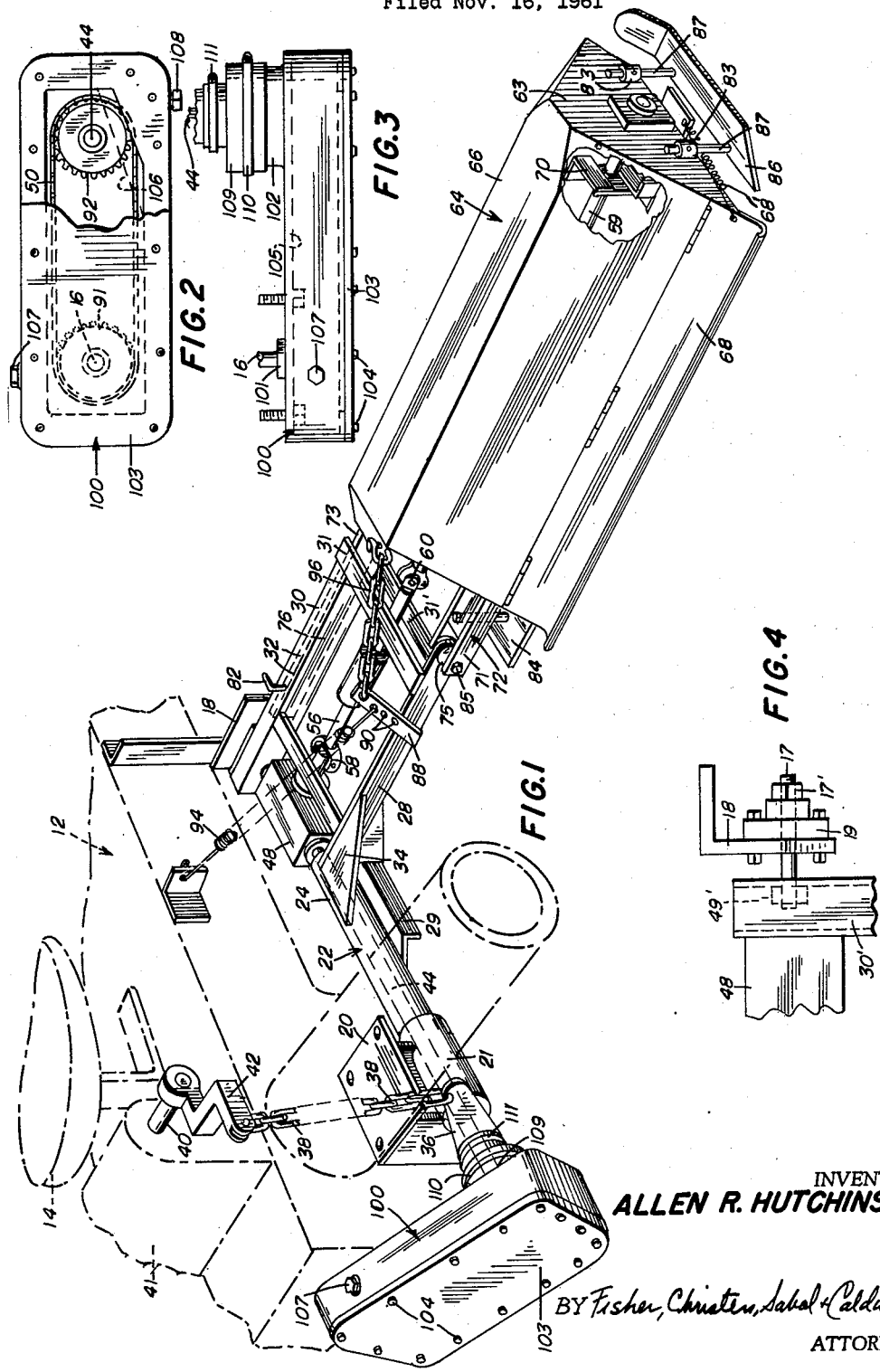
INVENTOR
ALLEN R. HUTCHINSON
BY Fisher, Christen, Sabol & Caldwell
ATTORNEYS 3,141,341
CULTIVATOR DRIVE ASSEMBLY
Allen R. Hutchinson, P.O. Box 3066, Orlando, Fla.
Filed Nov. 16, 1961, Ser. No. 152,868
2 Claims. (Cl. 74—11)

This invention relates to a cultivator assembly for attachment to the frame of a tractor, and is specifically directed to that type of cultivator for orchards and the like which extend outwardly from the side of the tractor a sufficient amount to enable the cultivator to reach under tree branches and the like so that areas closely adjacent the tree trunk may be properly tilled.

An important object of this invention is to provide framing structure for a plurality of cutting blades whereby the axis upon which the blades are mounted may be varied angularly with respect to the direction of travel of the tractor in a manner that the soil being disturbed will move toward, or away from, the end of the frame as the angular relationship of the axle of the cultivating members is changed.

A further object of this invention is to provide a housing for a plurality of power-operated cultivating members which rotate upon an axis substantially normal to the direction of travel such that the housing may be varied vertically with respect to the earth's surface without disturbing the power transfer means.

A still further object of this invention is to provide a first framing member which supports a rotating reel assembly and has means housing a rotating shaft which supplies the power for the reel assembly. The framing member is mounted so that it permits the assembly to pivot vertically with respect to the tractor without affecting the shaft.

Another important object of this invention is to provide a power train within the cultivator assembly which requires only one 90° transfer joint.

A still further important object of this invention is to provide a frame for a rotating reel-type blade cultivator such that the frame will be able to float free and swivel at ball joint connections permitting the frame to follow the contours of the ground during operation.

Another important object of this invention is to provide a reel frame housing adjustable angularly horizontally with respect to its vertically pivotable mounting so that the cultivator assembly may vary its attitude in both directions with respect to the direction of travel. In this manner, the assembly can account for varying soil conditions and the cultivating results desired.

Still another object of this invention is to provide a means by which the reel frame assembly may have various angular positions which may be fixed while the machine is in operation. This is accomplished by having one of its edge framing members slidably received in the main frame and having associated fastening means to secure it in place.

A still further object of this invention is to provide means for fully enclosing the power take-off chain and to supply continuous lubrication for this chain and the associated bearing means, this enclosure means being arranged to permit the implement to be raised or lowered without interference with the lubrication supply.

Further objects and advantages of the invention will be apparent from the following description taken in conjunction with the accompanying drawings wherein:

FIG. 1 is a perspective view of the invention on an enlarged scale;

FIG. 2 is a rear elevation on an enlarged scale of the drive housing, and;

FIG. 3 is a fragmentary plan view on an enlarged scale of the connection between the housing and the subframe.

FIG. 4 is a fragmentary view on an enlarged scale of a support point.

Referring now specifically to the drawings where like numbers indicate like parts, the assembly of this invention is indicated by the numeral 10. The assembly is adapted for attachment to a conventional tractor 12. In the embodiment disclosed, the tractor is of the wheeled type having a power take-off shaft 16 conveniently located behind the operator's seat 14. A pair of brackets 18 and 20 are welded or otherwise fixedly secured to a longitudinal side of the tractor and support the assembly thereto.

A generally F-shaped main frame 22 is supported between the brackets 18 and 20. The frame is comprised of a tubular leg 24 and a pair of parallel arms 28 and 30 perpendicular thereto. The arm 30 is a rectangular tube with a series of apertures 32 formed therein, and arm 28 is comprised of solid bar stock and is secured to the leg 22 by way of a welding plate 34. The arms are secured in fixed relationship with each other by way of channel iron 29 and straps 31 and 31'. The channel iron 29 extends underneath the assembly and is connected to an upright 22' at the outer end thereof. Bracket 20 is formed with a cylindrical loop 21 which rotatably supports tubular leg 24.

A stud 17 threaded at both ends extends through apertures provided in bracket 18 and in the extension 30' of arm 30. A flanged bearing piece 19 and a nut 21 are used to secure the stud to the bracket. The nut 49 is threaded on the other end of the stud to secure the arm 30'. Thus, the stud 17 carries the load to which the cutter assembly is subjected since the thrust load is placed on the stud by the nut 17' pulling against the stud and the bearing piece. This arrangement eliminates any thrust load being transmitted to the rear mounting bracket 20 since the tubular leg 24 is freely slidable and rotatable within the loop 21.

A lug 36 extends radially outward from the leg 24 at 35. A chain 38 is attached to the outer end of this lug, which lug is, in turn, connected to an operating rod 40 by way of a linkage member 42. The operating rod 40 may have control means such as hydraulic lift 41 extending to a point within easy reach of the operator.

As can best be seen by referring to FIG. 1, if linkage 42 is rotated in a clockwise direction, the tubular leg 24 will be pivoted upwardly a limited amount to raise the implement off the ground. By this means, the structure supported thereby may have its weight varied with respect to the ground surface. It should also be noted that chain 38 provides a stop to prevent frame 22 from over-pivoting in the event a ravine or the like is encountered, but provides no obstacle to the frame pivoting within loop 21, in response to irregularities in the ground surface.

A drive shaft 44 is axially received in leg 24 and is supported by a bearing 46 positioned within the rear end of the leg, and by a right-angle drive gear housing 48 at the front end thereof. The gear housing 48 is supported between the inner portions of arms 28 and 30. An endless chain 50 connects the drive shaft with the rotating shaft 16 previously mentioned. The respective ends of the two shafts 16 and 44 are equipped with sprockets 91 and 92 to receive the chain. Within the housing 48 is a conventional 90° power coupling which is the only one necessary in the cultivator assembly.

Motion is transferred from shaft 16 to shaft 44 by way of the chain 50. The shaft 44 carries the motion to housing 48 where a 90° turn is accomplished and power comes out via stub 51. Stub 51 is connected to a shaft 56 at joint 58, and the main cultivator support axle 59 receives the motion through universal joint 60. The shaft 56 is also provided with a spline and socket connection at 93 to permit telescoping movement of the shaft during changes in the position of the cultivator.

The axle 59 is rotatably supported in side plates 61 and 63 of the framing housing 64. The housing 64 is protective in nature and basically is comprised of the side plates, a cover 66 and tail flap 68. A plurality of cultivator knives 70 are spaced along the length of axle 59 and rotate therewith. A pair of double railed support bars 72 and 74 run the longitudinal length of housing 64 and provide a framing therefor.

A yoke 71 is formed at the inboard end of rail 72. A spherical joint 75 at the outer end of arm 28 is received by yoke 71. An extension 76, having a pluraltiy of apertures therein adapted to mate with the apertures 32 in leg member 30 is formed with a spherical joint (not shown) similar to joint 75 for connection with a yoke 73 provided at the inner end of housing 64. A flared channel (not shown) in sphere 75 permits bolt 85 to secure the yoke 71 to the sphere to permit swivel movement. These ball joints and flared channels of the yokes permit the frame to swivel an amount necessary to absorb many of the vibrations encountered, and aid in the efficiency and durability of the assembly.

The cultivator housing assembly 64 can have its lateral angular relationship with respect to arms 28 and 30 varied to the extent of telescoping permitted between extension 76 and arm 30. After the desired angulation is determined, the apertures in extension 76 and the apertures in leg 32 are matched and a pin such as that indicated by the numeral 82 is inserted and the assembly locked in this adjusted position.

It can be seen, therefore, that the angle between housing or cultivator head 64 and the sub-frame 22 can be adjusted and locked into position. The housing 64 has a plurality of ground-engaging skid members 84 and 86 along the lower surface thereof. It can also be seen that the housing 64 easily follows the irregularities of the earth's surface by riding on skids 84 and 86 pivoting vertically by way of frame 22. Note that the skids have rods 87 adjustably received in sleeves 83 of the cultivator head.

As seen in FIG. 1, extending upwardly from leg 28 is a pivotable lug 88 having a plurality of apertures 90 therein. This lug is attached to the main tractor frame by way of spring 94 which is under tension in its normal position. The lug 88 is also attached to housing 64 by way of the chain 96. These elements, working in cooperation with the position of lug 36, permit the proper weight on cultivator knives 70 as they cut the ground.

In order to reduce wear on the chain 50 to a minimum, and to extend its life almost indefinitely, novel means has been provided for continuously lubricating the chain and its associated elements. To accomplish this purpose, an elongated housing is provided which completely surrounds the chain and the two sprockets 91 and 92. The front side of this housing is provided with a pair of spaced openings (not shown) to receive the shafts 16 and 44. These openings may be of substantial size and are surrounded by the forwardly projecting circular flanges 101 and 102, respectively. A removable cover plate 103 forms the rear wall of the housing and is secured to the housing by means of studs 104. In attaching the cover to the housing, suitable sealing means, such as a conventional gasket, is applied between the cover and the housing in order to make the interior of the housing fluid-tight. The housing is rigidly attached to the rear end of the tractor as by means of the plate 105.

Since the shaft 44 is normally positioned in a plane spaced below the plane of the shaft 16, the housing 100 is positioned in a direction extending angularly downwardly away from the shaft 16, thus, the interior of the lower end of the housing forms a convenient reservoir for a supply of lubricating oil; the upper level of which is indicated by the dotted line 106. A filler plug 107 and a drain plug 108 are provided for replenishment or removal of oil.

It will be noted that the upper level of the oil is sufficiently high so that the sprocket 92 and the lower end of the chain 50 are continuously submerged therein; but, at the same time, the oil does not extend up to the level of the opening through which the shaft 16 is received. Therefore, it is not essential that there be a fluid-tight connection between the housing and the rear end of the tractor. Nevertheless, the opening through which the shaft 44 is received is below the level of the oil and novel means has been provided to contain the oil which would otherwise leak out of this opening, and, at the same time, to supply lubrication to the bearing 46 within the tubular member 24.

For this purpose, a short length of flexible oil-resistant tubular material 109 extends between the flange 102 and the rear end of the tubular member 24, and an adjustable clamp 110 is applied to the exterior of one end of the tube to secure it in fluid-tight connection with the flange 102 and another adjustable clamp 111 secures the tube in fluid-tight relation with the end of the tubular member 24. Since the bearing 46 is provided with the usual seal at its forward end, any of the oil which may escape from the reservoir in the housing 100 will not pass forwardly through the member 24 beyond the rear bearing.

Because of the fact that there is a certain amount of relative rotation between the tubular element 24 and the flange 102 whenever the implement frame is raised or lowered, the tube 109 should be composed of a material having sufficient elasticity to permit this relative movement. As previously stated, the material used must also be resistant to attack by the lubricating oil, as well as the usual elements of the weather. A material such as neoprene is suitable for this purpose, but many other compositions having the required elasticity and resistance to destructive forces are well known and commercially available.

This invention also permits a limited amount of misalignment of shaft 44 with respect to the housing, as well as relative lateral displacement caused by vibration or changes in relative positions of the various elements due to attaching or removing of the implement from the tractor.

Having described and shown a preferred form of apparatus embodying the invention, it will be understood that various modifications and improvements may be made in the structure which will come within the scope of the annexed claims.

I claim:

1. In mechanisms for operating implements detachably mounted on mobile vehicles provided with a power take-off shaft, the combination including a main implement frame including an elongated tubular member, detachable mounting means for mounting said frame on a vehicle for limited rotation of said tubular member about its longitudinal axis parallel with the axis of the vehicle take-off shaft, a driven shaft, bearing means for supporting said shaft within the tubular member, first and second sprocket wheels fixed to the take-off shaft and to the driven shaft respectively, flexible chain means operatively connecting the sprocket wheels, elongated housing means enclosing said sprocket wheels and chain means, means for detachably mounting said housing means on a vehicle, said housing means having an opening adjacent one end through which one end of said driven shaft may be loosely received, sealing means within the tubular member adjacent said one end of the shaft, and flexible enclosure means joining one end of the tubular member and the elongated housing and surrounding said opening for the driven shaft, whereby lubricating oil may be contained within said housing means and said tubular member may be rotated and radially displaced to a limited extent with respect to the enclosure.

2. The invention as defined in claim 1, wherein the opening in said housing adjacent said one end is positioned below the axis of the power take-off shaft.

References Cited in the file of this patent

UNITED STATES PATENTS

| | | |
|---|---|---|
| 1,097,217 | Ferguson | May 19, 1914 |
| 1,960,693 | Bryant | May 25, 1934 |
| 2,226,388 | Richter | Dec. 24, 1940 |
| 2,692,770 | Nallinger et al. | Oct. 26, 1954 |
| 2,757,504 | Elfes et al. | Aug. 7, 1956 |
| 2,801,509 | Salzmann | Aug. 6, 1957 |